(12) United States Patent
Wilkosz

(10) Patent No.: US 6,312,028 B1
(45) Date of Patent: Nov. 6, 2001

(54) MOTOR VEHICLE ENERGY ABSORBING MEMBER

(75) Inventor: Daniel E. Wilkosz, Ypsilanti, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/454,731

(22) Filed: Dec. 4, 1999

(51) Int. Cl.⁷ .............................. B60R 19/34; B60R 19/30
(52) U.S. Cl. ...................... 293/133; 293/136; 296/146.6; 296/189; 296/203.01; 49/502; 188/377
(58) Field of Search .................................. 296/187, 188, 296/189, 203.01, 203.02, 203.03, 203.04, 146.6; 293/133, 136, 121; 49/502; 188/371, 377

(56) References Cited

U.S. PATENT DOCUMENTS

| | | |
|---|---|---|
| 3,010,540 | 11/1961 | Dahlen . |
| 3,082,846 | 3/1963 | Jensen et al. . |
| 3,829,149 * | 8/1974 | Stevens .............................. 296/28 R |
| 3,868,796 * | 3/1975 | Bush ...................... 52/618 |
| 4,058,188 * | 11/1977 | Vrillon ................ 188/1 C |
| 4,104,118 | 8/1978 | Housman . |
| 4,378,394 * | 3/1983 | Miura et al. ................ 428/113 |
| 4,378,395 * | 3/1983 | Asoshina et al. ............. 428/158 |
| 4,399,174 * | 8/1983 | Tanaka et al. .............. 428/67 |
| 4,413,856 * | 11/1983 | McMahan et al. ............... 296/188 |
| 4,440,434 * | 4/1984 | Celli .................... 296/185 |
| 4,451,518 * | 5/1984 | Miura et al. ............... 428/137 |
| 4,601,367 * | 7/1986 | Bongers ................ 188/376 |
| 4,769,951 * | 9/1988 | Kaaden ................ 49/502 |
| 4,861,097 * | 8/1989 | Wyceech ................ 296/188 |
| 5,124,186 | 6/1992 | Wycech ................ 428/35.8 |
| 5,150,944 * | 9/1992 | Yoshida et al. ................ 296/203 |
| 5,154,462 | 10/1992 | Carpenter .............. 293/120 |
| 5,181,549 | 1/1993 | Shapovalov .................. 164/79 |
| 5,277,469 | 1/1994 | Klippel .................. 296/146.6 |
| 5,306,066 * | 4/1994 | Saathoff ................ 296/146.6 |
| 5,344,208 * | 9/1994 | Bien et al. ............. 296/187 |
| 5,395,135 * | 3/1995 | Lim et al. .............. 280/751 |
| 5,417,022 | 5/1995 | Ritchie ............... 52/309.13 |
| 5,531,500 * | 7/1996 | Podvin ............... 296/152 |
| 5,611,568 | 3/1997 | Masuda ............... 280/784 |
| 5,678,826 * | 10/1997 | Miller ................ 277/1 |
| 5,700,050 * | 12/1997 | Gonas ............. 296/189 |
| 5,732,801 * | 3/1998 | Gertz .............. 188/377 |
| 5,749,600 * | 5/1998 | Yamada et al. ........... 280/751 |
| 5,806,919 * | 9/1998 | Davies ............ 296/205 |
| 5,820,202 | 10/1998 | Ju ................ 296/146.6 |
| 5,992,923 * | 11/1999 | Wycech ............. 296/188 |
| 5,997,077 * | 12/1999 | Siebels et al. ........ 296/189 |
| 6,056,349 * | 5/2000 | Seksaria et al. .......... 296/146.6 |
| 6,068,330 * | 5/2000 | Kasuga et al. .......... 296/189 |

FOREIGN PATENT DOCUMENTS

| | | |
|---|---|---|
| 19856162 | 6/2000 | (DE) . |
| 0530042 | 3/1993 | (EP) . |
| 0831005A2 | 3/1998 | (EP) . |

\* cited by examiner

*Primary Examiner*—Stephen T. Gordon
*Assistant Examiner*—G Blankenship
(74) *Attorney, Agent, or Firm*—Damian Porcari; William J. Coughlin

(57) ABSTRACT

A motor vehicle structural energy absorbing member (12) is light weight and is made in a manner to produce random or directionally oriented, elongated pores or voids (16) in a structural matrix (14) in a manner that permits tailoring of impact energy absorption in one or more direction(s) to provide an integral energy absorbing region.

12 Claims, 4 Drawing Sheets

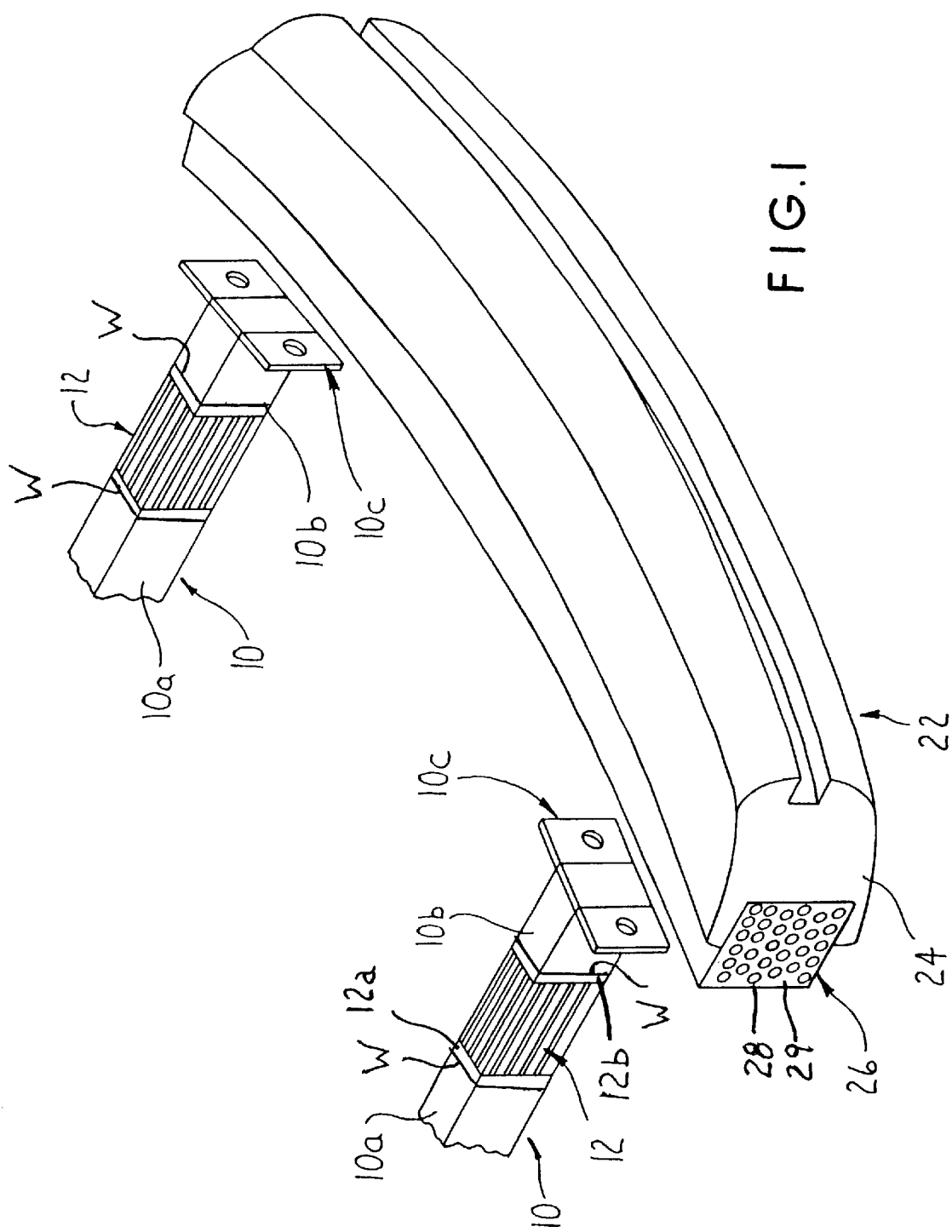

MOTOR VEHICLE ENERGY ABSORBING MEMBER

BACKGROUND OF THE INVENTION

1. Field of the Invention

The present invention relates to motor vehicle energy absorbing structural members for absorbing impact energy.

2. Description of Related Art

Modern motor vehicles are known to incorporate energy absorbing structural members that are designed to absorb impact energy when the vehicle is involved in a crash. Such energy absorbing members include steel door beams residing inside the doors of the vehicle to absorb a side impact and bumper extensions and frame members which are designed to have collapsible zones to collapse on impact. Various materials have been used to fabricate such energy absorbing members including bulky steel and aluminum alloy plates and beams, non-metallic materials such as polymers and other plastics, and composite materials that include a metal-metal composites, metal-polymer composites and others.

An object of the present invention is to provide an improved vehicle structural energy absorbing member.

SUMMARY OF THE INVENTION

The present invention provides a structural energy absorbing member that is light weight and that is made in a manner to produce pores or voids in a structural matrix to provide an integral energy absorbing region and that permits tailoring of impact energy absorption in one or more anticipated directions of impact. The pore or void structure, geometry, distribution, and concentration in the structural matrix can be controlled to provide energy absorption tailored to particular impact situations. The structural matrix can comprise metallic materials and ceramic materials. The energy absorbing structural member can comprise a frame rail member, bumper member, door beam and other structural energy absorbing member connected to a second structural member of the motor vehicle. Not only are the structural energy absorbing member pursuant to the invention advantageous as a result of their light weight, but also smaller structural energy absorbing members pursuant to the invention may be used in lieu of larger hollow structural components of the motor vehicle ad a result of the structural matrix thereof providing greater load carrying capacity compared to a similar sized hollow component. The structural energy absorbing members pursuant to the invention may be used as sound dampening structural members incorporated into the vehicle frame, strut frames, control arm links, engine and transmission mounts, and the like of a motor vehicle.

The above objects and advantages of the present invention will become more readily apparent from the following description taken with the following drawings.

BRIEF DESCRIPTION OF THE DRAWINGS

FIG. 1 is an exploded perspective view of a motor vehicle bumper frame extension and a bumper including energy absorbing structural frame members pursuant to embodiments of the invention.

DETAILED DESCRIPTION OF THE PREFERRED EMBODIMENT

Figure 1A:
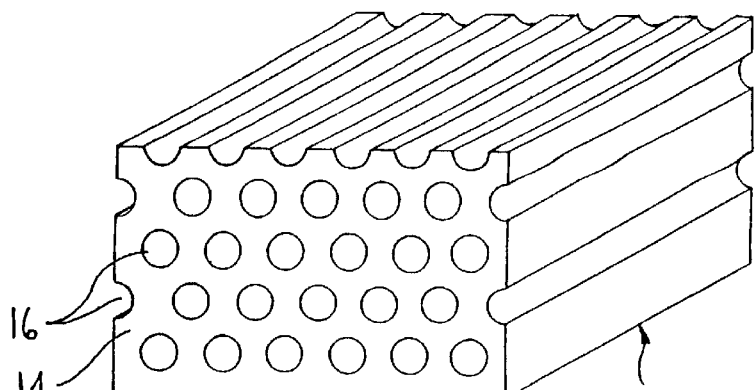
FIGS. 1A, 1B, 1C, 1D, and 1E are partial perspective views of energy absorbing members pursuant to various embodiments of the invention.
Figure 1B:
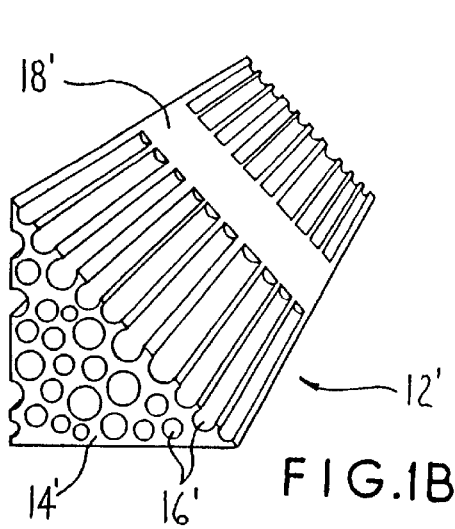
Figure 1C:
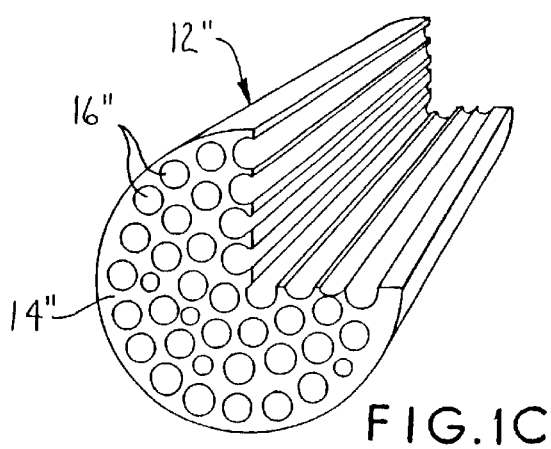
Figure 1D:
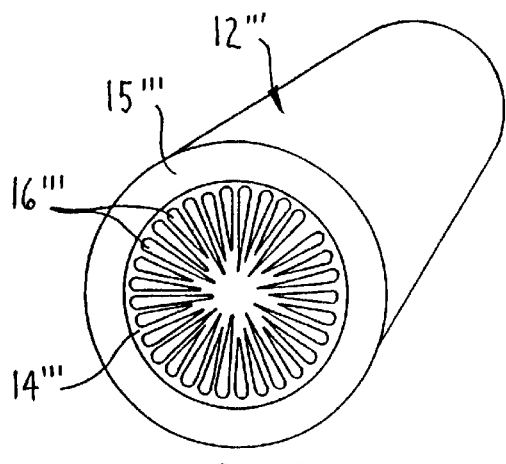
Figure 1E:
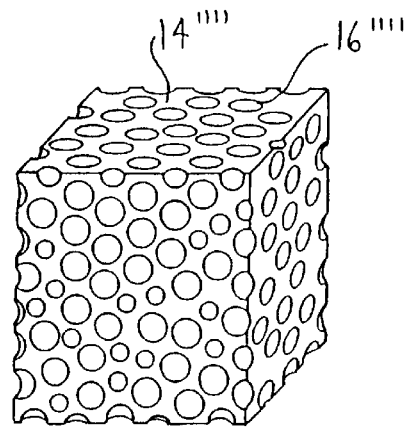

Referring to FIG. 1, motor vehicle bumper frame extensions 10 and bumper assembly 22 including respective energy absorbing structural frame members 12 and 26 pursuant to embodiments of the invention are illustrated. The bumper frame extensions 10 include respective tubular elongated structural members 10a, 10b between which a respective energy absorbing structural member 12 pursuant to the invention is connected by welding, mechanical fasteners or other fastening technique. The tubular bumper frame extension members 10a, 10b typically are formed of steel or aluminum alloy tubes with the extension members 10b having a respective flange 10c fastened thereon for attachment to the bumper assembly 22. In FIG. 1, the tubular bumper frame extension members 10a, 10b are shown welded by welds W to the opposite axial ends of the respective energy absorbing structural members 12 for purposes of illustration only.

The energy absorbing structural members 12 each comprise a solid structural matrix 14 having a plurality of directionally oriented, elongated pores or voids 16 therein. The structural matrix 14 can comprise metallic, ceramic and plastic materials. For example only, for joining to the steel or aluminum alloy bumper frame extension members 10a, 10b, the matrix 14 can comprise steel or aluminum alloy, respectively, that is readily weldable to the frame extension members 10a, 10b. The structural matrix 14 typically is a solid material to impart needed mechanical properties to the energy absorbing members 12, although the matrix 14 may contain some porosity so long as adequate structural properties are exhibited by the energy absorbing members 12.

The elongated pores 16 are illustrated in FIG. 1 as extending parallel to one another preferentially along the longitudinal axis of the energy absorbing members 12 to define an integral energy absorbing region that can axially collapse in a frontal impact of the motor vehicle to absorb impact energy. That is, the elongated pores or voids 16 are aligned generally parallel to the direction of anticipated frontal impact of the motor vehicle. However, the pores or voids 16 can be oriented in other directions relative to the energy absorbing members 12 to permit tailoring of impact energy absorption in an anticipated impact direction(s). The pore or void structure, geometry, distribution, and concentration in the structural matrix 14 also can be controlled to this end to provide energy absorption tailored to particular impact situations. The energy absorbing members 12 can be made with controlled pore or void orientation, structure, geometry, distribution, and concentration in the structural matrix 14 as described in U.S. Pat. No. 5,181,549 wherein a gas is dissolved in a molten matrix material under pressure and then the molten matrix material is cooled in a manner to form the elongated pores and voids 16 as a solidification front progresses through the molten matrix material in a mold. The teachings of U.S. Pat. No. 5,181,549 are incorporated herein by reference with respect to manufacture of porous members.

The energy absorbing members 12 can be made as taught in the aforementioned patent to include solid end regions 12a, 12b where the energy absorbing members 12 are welded to the bumper frame extension members 10a, 10b. Such solid end regions 12a, 12b facilitate welding or other fastening of the energy absorbing members 12 to the structural members 10a, 10b.

Referring again to FIG. 1, the bumper assembly 22 is shown including an energy absorbing bumper beam 26 that is fastened to a decorative, resilient plastic (e.g. molded polyurethane) bumper fascia 24 and to the flanges 10c of the bumper frame extension by mechanical fasteners (not shown) or other fastening means. The energy absorbing bumper beam 26 includes a plurality of elongated pores or voids 28 extending parallel to one another preferentially along the longitudinal axis thereof in a solid structural matrix 29 to define an energy absorbing region that can collapse from front-to-back laterally in an anticipated frontal impact of the motor vehicle to absorb impact energy. That is, the elongated pores or voids 28 are aligned generally transverse or perpendicular to the direction of anticipated frontal impact of the motor vehicle. The energy absorbing bumper beam 26 can be made in the manner taught in aforementioned U.S. Pat. No. 5,181,549 already incorporated herein by reference.

Although n FIGS. 1 and 1A the energy absorbing members 12 and 26 are illustrated as having a rectangular cross-section, the invention is not so limited. The energy absorbing members can have any suitable cross-section suited to a particular application as a motor vehicle structural member. For example, referring to FIGS. 1B through 1D, energy absorbing member 12' can include a triangular cross-section, FIG. 1B, with pores or voids 16' elongated along a longitudinal axis of the solid matrix 14'. The matrix 14' can include a solid central region 18' or attachment by welding, mechanical fasteners, and the like to a second motor vehicle structural member (not shown) or to provide a support region for mounting of a motor vehicle component thereon. Alternately, energy absorbing member 12" can include a circular cross-section, FIG. 1C, with pores or voids 16" elongated along a longitudinal axis of the solid matrix 14". Further, energy absorbing member 12'" can include a circular cross-section, FIG. 1C, with pores or voids 16'" elongated along a radial direction of the solid matrix 14'". A solid outer casing or housing 15'" comprising metal, ceramic and other materials can be provided about the matrix 14'" for attachment to a second motor vehicle structural member (not shown) or to provide a support region for mounting of a motor vehicle component thereon. Energy absorbing member 12"" also can include randomly oriented, spherical pore or voids 16"" in a solid structural matrix 14"" rather than the directionally oriented, elongated pores or voids shown in the other figures.

Figure 2:
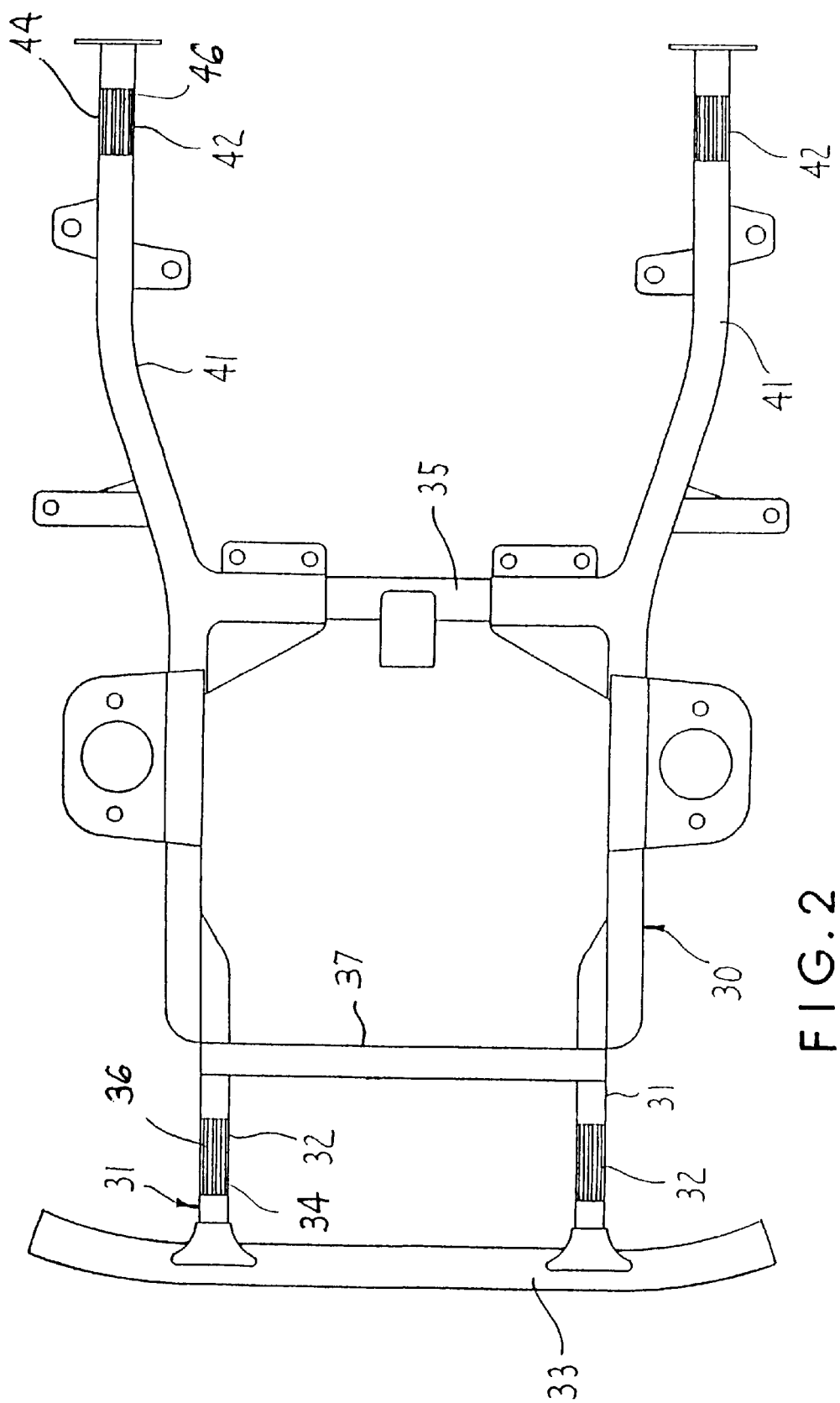
FIG. 2 is a plan view of a motor vehicle frame including energy absorbing frame members pursuant to embodiments of the invention.

Referring to FIG. 2, a frame 30 for a motor vehicle is illustrated as including forward side frame members 31, bumper assembly 33, rearward side frame members 41, and cross frame members 35, 37. The side frame members 31, 41 can include respective energy absorbing members 32, 42 of the type described hereabove pursuant to the invention having multiple elongated pores or voids 36, 46 extending through a solid structural matrix 34, 44 in a manner similar to that shown in FIG. 1A.

Figure 3:
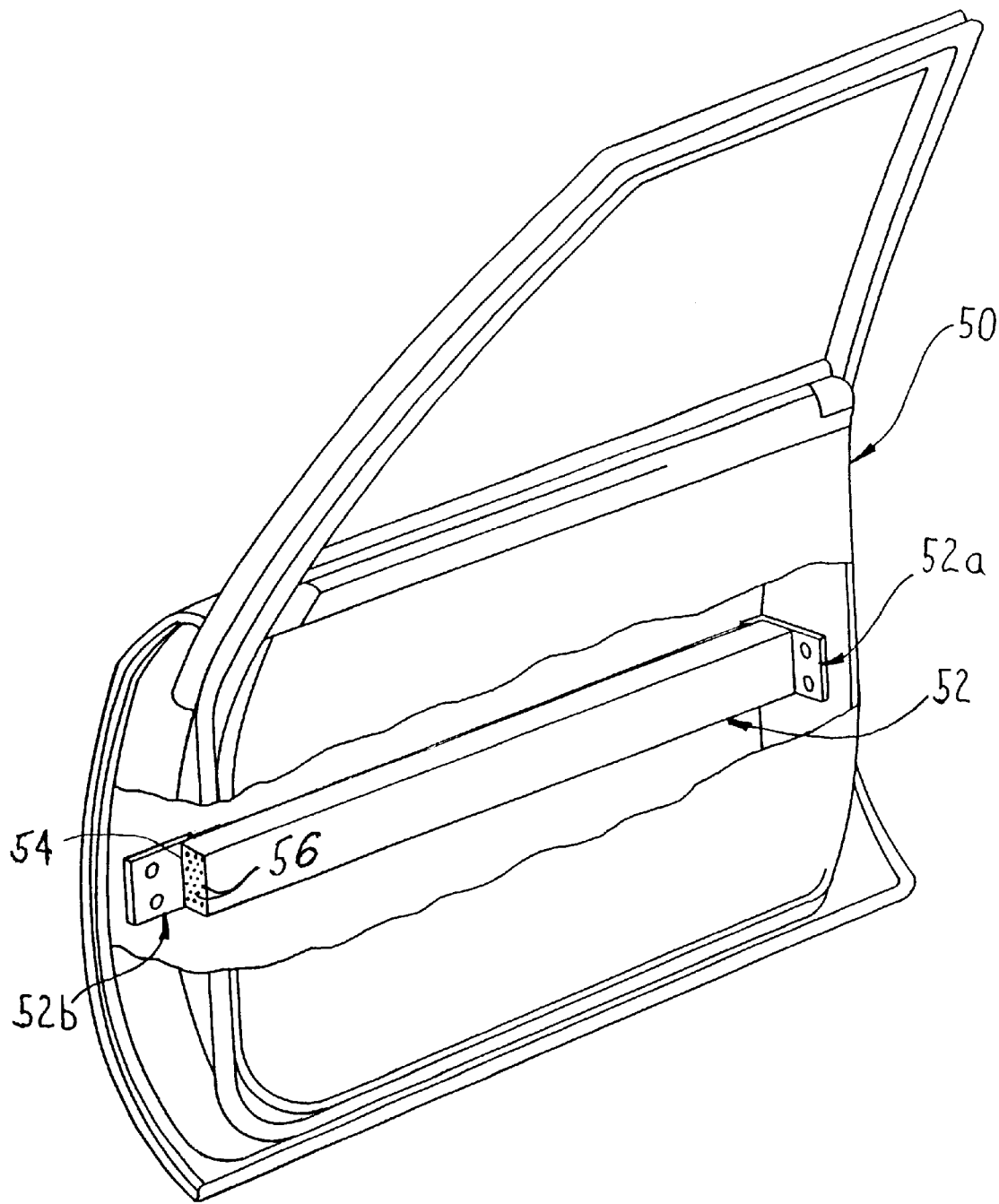
FIG. 3 is a perspective view of a motor vehicle door having an energy absorbing door side beam pursuant to an embodiment of the invention.

Referring to FIG. 3, a door 50 for a motor vehicle is illustrated as including an energy absorbing door beam or member 52 pursuant to the invention having multiple elongated pores or voids 56 extending through a solid structural matrix 54. The voids 56 extend along the longitudinal axis of the door beam 52 so as to be oriented perpendicular to the direction of anticipated impact force on the door. The energy absorbing door beam 5, is mounted on a brackets 52a, 52b that are welded or mechanically fastened to the door 50.

While the invention has been described in terms of specific embodiments thereof, it is not intended to be limited thereto but rather only as set forth in the appended claims.

What is claimed is:

1. A motor vehicle structural energy absorbing member, comprising:

a structural load-carrying matrix without a hollow structural member thereabout and voids in said matrix to provide an integral energy absorbing region.

2. The member of claim 1 wherein said matrix is selected from the group consisting of metallic material and ceramic material.

3. The member of claim 2 wherein said metallic material is selected from the group consisting of steel and aluminum.

4. The member of claim 1 wherein said voids are elongated preferentially along a longitudinal axis of said member.

5. The member of claim 1 which further includes a relatively solid region that is formed integral with said structural matrix and is connected to a second structural member of a motor vehicle.

6. The member of claim 5 wherein said relatively solid region is welded to said second member.

7. The member of claim 1 which further includes a relatively solid peripheral region that is formed integral with said structural matrix about said member.

8. A motor vehicle structural frame, comprising a first structural member and a second structural member connected thereto, said second structural member having a structural load-carrying matrix that is part of said motor vehicle structural frame without a hollow structural frame member about said second structural member and voids in said matrix to provide an integral energy absorbing region.

9. A motor vehicle bumper assembly, comprising a first structural member and a second structural beam member connected thereto, said second structural beam member having a structural matrix selected from the group consisting of a metallic material and a ceramic material and voids in said matrix to provide an integral energy absorbing region.

10. A motor vehicle door, comprising a first structural member and a second structural member connected thereto, said second structural member having a structural matrix selected from the group consisting of a metallic material and a ceramic material and voids in said matrix extending along a longitudinal axis of said second structural member to provide an integral energy absorbing region.

11. A motor vehicle structural frame, comprising a first structural member, a second structural member, and a third structural member connected therebetween, said third structural member having a structural load-carrying matrix that is part of said motor vehicle structural frame and voids in said matrix to provide an integral energy absorbing region, said third structural member having relatively solid, opposite ends that are connected to respective ends of said first structural member and second structural member.

12. A motor vehicle structural frame, comprising a first elongated structural member, a second elongated structural member, and a third elongated structural member connected therebetween, said third structural member having a structural load-carrying matrix that is part of said motor vehicle structural frame and voids in said matrix to provide an integral energy absorbing region, said voids being elongated preferentially along a longitudinal axis of said third structural member.

* * * * *